March 31, 1953  T. F. N. ALEXANDER  2,632,979
METHOD OF GROWING GRASS AND OTHER VEGETATION
Filed Aug. 2, 1949
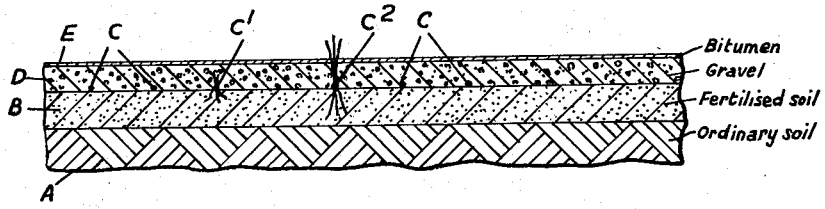
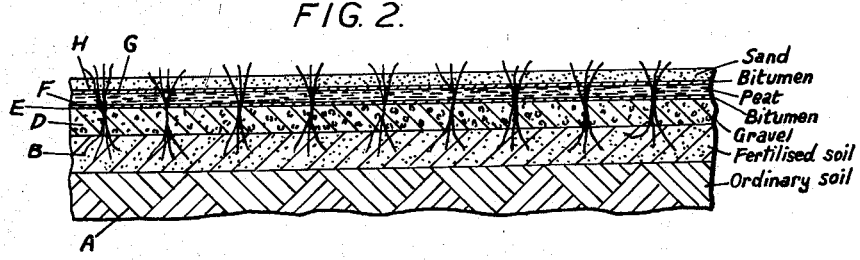
Inventor
Thomas Francis Heath Alexander
By
Dowell и Dowell
Attorneys Patented Mar. 31, 1953

2,632,979

UNITED STATES PATENT OFFICE 2,632,979

METHOD OF GROWING GRASS AND OTHER VEGETATION

Thomas Francis Neath Alexander,
Bristol, England

Application August 2, 1949, Serial No. 108,085
In Great Britain August 4, 1948

14 Claims. (Cl. 47—58)

This invention relates to the growing of grass and other perennial plants (referred to generally herein as grass) from seed.

The primary purpose of the invention is to promote and speed up the germination of the seed and to maintain vigorous growth after germination.

The first essential is that the seed bed, i. e. the material in or on which the seed is sown, should be of a composition suited to the type of grass to be grown, or that the type of grass to be grown be chosen in accordance with the composition of the seed bed. The preparation of the seed bed forms no part of the invention, it being assumed in what follows that it will be effected in accordance with generally accepted principles and involve, where appropriate, the use of the usual fertilizers.

For germination, appropriate conditions of temperature and humidity must be present. The degree of moisture required is not particularly critical but there are upper and lower limits. Too little moisture is generally the result of evaporation to the atmosphere; too much moisture is generally the result of absorption from above. Both of these undesirable conditions can be avoided by making the surface through which the grass must pass to reach the atmosphere impervious to moisture. When that is done, it is found that sufficient moisture is drawn up from below into the seed bed. It is also found that this leads to a raising of the temperature beneath the impervious surface. The conditions obtaining below the surface are, therefore, akin to those existing in a hot-house and can be considered to be "forcing" conditions which will promote rapid germination.

It remains then to ensure that the grass will be able to find its way through the impervious layer to the atmosphere. Immediately after germination, the grass is very tender and is not in a fit condition to force its way through a hard, close layer. Moreover, it is not in a condition in which it can safely be allowed to leave the favourable hot-house conditions under which it has been brought into being. It needs to be allowed to be nurtured to some extent.

In accordance with the invention, therefore, the seed bed, after being sown, is covered with a layer of material through which the young tender grass can grow freely until, by the time it reaches the impervious surface, it has no difficulty in pushing its way through. That layer is best formed of gravel, free from sharp edges and consisting of a mixture of particles varying in size from $\frac{1}{8}$ to $\frac{3}{16}$ inch and laid at the rate of from 12–36 lb. per square yard. The impervious surface is best provided by applying to the layer of gravel a bituminous emulsion at the rate of from 6–25 oz. of bitumen per square yard.

Remarkable results have been obtained by the use of the invention, particularly with regard to rapidity of germination. These are thought to follow from the considerations set out above and from the fact that the impervious layer, in addition to maintaining the optimum conditions of humidity and temperature also serves to prevent loss of nitrogen which, as is well known, is a good promoter of germination and is a constituent of the commonly used fertilisers.

Equally remarkable results have been obtained by the use of the invention with regard to vigour of growth. After the seeds have germinated and the grasses have started to grow, more moisture and some aeration of the subsoil is required in order that growth may continue. This is automatically provided by the grasses themselves which, in pushing their way through the successive layers of gravel, bitumen and peat, make holes through which surface moisture and air can pass down to the root system.

The improved rate of growth manifests itself not only above ground but also below ground, the root growth being very pronounced without detracting from the blade growth. This leads to the important advantage that the invention provides a solution to the problem of preventing soil erosion and creep, for example, on embankments.

I will explain the invention with reference to the accompanying drawing which illustrates several practical embodiments thereof, and will summarize in the claims the essential features of the invention for which protection is desired.

In said drawing:

Fig. 1 is a section diagrammatically illustrating one method or arrangement of the seed bed, on the sub-soil, covered with gravel and bitumen, according to my invention.

Fig. 2 is a section similar to Fig. 1, but showing a modification of the method or arrangement.

The invention is illustrated diagrammatically in Figure 1 of the accompanying drawing.

In that figure, the sub-soil is indicated at A. B is the seed bed prepared as indicated above. C are the seeds which are sown at a density dependent upon the kind of greensward that is wanted. For example, in the case of meadow land, the seed might be sown at about $\frac{1}{2}$ oz. to the square yard; in the case of a bowling green or tennis court requiring a dense sward, the seed might be sown at about 2 oz. to the square yard.

D indicates the layer of gravel or substantially permanently granular mass, and E the impervious layer of bitumen.

At C1 is shown a seed shortly after germination from which it will be observed that the blade of grass has been allowed to grow to some extent before called upon to force its way through the bituminous layer.

At C2 is shown a blade of grass at a later stage of development which has pushed its way through the bitumen and has made for itself a closely fitting hole through which surface moisture can percolate to the roots.

The resistance to penetration of the bituminous layer by the grass is an important factor which depends both on the nature of the bitumen and on the thickness of the layer. Best results have been obtained with an emulsion of

|  | Percent by weight |
|---|---|
| Bitumen having a penetration measured on the Dow penetrometer of from 300–500 | 40 |
| 2½% aqueous solution of potash soap | 60 | applied, as indicated above at the rate of from 6–25 oz. of bitumen per square yard depending upon the nature of the grass.

It is of importance that the bituminous emulsion be applied very evenly. Failure to do so can result in uneven growth of the grass. Where large plots are being dealt with, this presents no particular difficulty as mechanical spraying apparatus will generally be used which is regulated so as to apply the required amount in a single continuous pass. Where, however, small plots are being dealt with, a hand spray will generally be used. It is then difficult to provide a layer of even thickness, in particular, excessively thick patches are likely to occur. To avoid this, it is best to adopt the scheme illustrated diagrammatically in Fig. 2.

In that figure, as in Fig. 1, the seed bed B is covered with a layer of gravel D which receives a layer of bitumen E. The bituminous layer is, however, less thick than the layer E in Figure 1 being, for example, such as can be readily applied in a single continuous pass with a hand spray. When the seeds have germinated and the grass starts to show through the layer E, the latter is covered with a layer of granulated peat F or other substantially permanently granular mass and another thin layer of bitumen G is applied thereto. The total thickness of the two bituminous layers E and G is about the same as the thickness of the single layer E in Fig. 1.

In both of the cases illustrated, it is advantageous to cover the bituminous layer (E in Fig. 1 and G in Fig. 2) with a layer of sand or gravel (as indicated at H in Fig. 2) at the rate of about 7 lb. per square yard. As a result of the "hot-house" conditions referred to above, there may be some evaporation below the impervious layer and as the vapour so formed cannot escape before the grass has pushed through the bitumen local swellings or waviness of the surface appear. The extra weight provided by the top layer of gravel helps to keep the surface flat. The best way of avoiding such waviness, however, is to apply pressure by rolling. The rolling is best done as soon as the grass appears and thereafter at intervals of about 2 or 3 days for about 14 days. A roller weighing about 75 lb. per foot length has given good results.

When the bituminous layer has served its primary purpose of producing the desirable hot-house conditions, it still plays an important part in that it stabilises or strengthens the soil in which the grass is growing. In point of fact it becomes dispersed in the gravel or other substantially permanently granular mass beneath it and in any material with which it has been covered such as the gravel or sand mentioned above or such materials as sawdust or earth. The load carrying properties of the soil are thus greatly increased leading to valuable wearing qualities such as are required particularly for playing fields. The surface thus produced also has the merit of being non-slippery and providing the secure foothold that is so valuable, for example, to the tennis player.

As already indicated, the invention is particularly useful for covering with grass large areas such as tennis courts, bowling greens, golf greens, aerodromes, grazing fields and so on and for consolidating embankments. It can also be used for the production of turves for subsequent use in laying or patching lawns. The turves in accordance with the invention have the big advantage over ordinary turves that they are much more coherent and, therefore, can withstand much more rough handling.

The type of grass used will, of course, vary in accordance with the purpose which it is to serve. Fine grasses would be used for bowling and golf greens and the like and coarse grasses for grazing land, playing fields and the like. Good results have been obtained with a wide variety of grasses such as:

*Agrostis alba,*
*Agrostis tenuis* (or creeping bent),
*Festuca pratensis* (or chewings fescue),
*Festuca rubra* (or sheep's fescue),
*Phleum pratense* (or timothy)
*Lolium perenne* (or rye grass)
*Poa annua* (or rough stalk)
*Dactylis glomerata* (or cocksfoot).

Of the fine grasses, *Agrostis tenuis* has given the best results.

With the finer grasses it has been found advantageous to replace the layer of gravel by a layer of granulated peat, or other substantially permanently granular mass, the layers which are superimposed upon the seed bed then consisting of peat, bitumen and peat.

I claim:

1. A method of growing grass to promote germination and to maintain vigorous growth after germination, while preventing soil erosion, comprising the steps of preparing a seed bed above a sub-soil; sowing seed therein; covering said bed with a substantially permanently granular mass offering little resistance to the growth of the grass immediately after germination of the seed; and covering said granular mass with a layer of bitumen which is impervious to moisture from above and below while maintaining optimum conditions of humidity and temperature and of such physical characteristics as will enable said grass after passing through said granular layer to grow therethrough, thereby aerating the seed bed.

2. A method as claimed in claim 1 in which said granular mass comprises gravel free from sharp edges and consisting of a mixture of particles ranging in size substantially from ⅛ to 3/16 of an inch.

3. A method as claimed in claim 2, in which said granular mass is laid at the rate of from 12–36 lbs. per square yard.

4. A method of growing grass to promote germination and to maintain vigorous growth after germination, while preventing soil erosion, comprising the steps of preparing a seed bed above a sub-soil; sowing seed therein; covering said bed with a granular mass offering little resistance to the growth of the grass immediately after germination of the seed; and covering said granular mass with a layer of bitumen which is impervious to moisture from above and below while maintaining optimum conditions of humidity and temperature and of such physical characteristics as will enable said grass after passing through said granular layer to grow therethrough, thereby aerating the seed bed, said bituminous layer containing bitumen having a penetration measured on the Dow penetrometer of from 300–500.

5. A method as claimed in claim 4, in which said bitumen is laid in the form of an emulsion of 40% and 60% by weight of an aqueous solution of potash soap, said emulsion being laid at the rate of approximately 6–25 oz. of bitumen per square yard.

6. A method of growing grass to promote germination and to maintain vigorous growth after germination, while preventing soil erosion, comprising the steps of preparing a seed bed above a sub-soil; sowing seed therein; covering said bed with a granular mass offering little resistance to the growth of the grass immediately after germination of the seed; and covering said granular mass with a layer of bitumen which is impervious to moisture from above and below while maintaining optimum conditions of humidity and temperature and of such physical characteristics as will enable said grass after passing through said granular layer to grow therethrough, thereby aerating the seed bed, covering said bitumen layer with a second layer of granular mass; and covering said second granular mass with a second layer of bitumen.

7. In a method as set forth in claim 6, said second granular layer comprising granulated peat.

8. In a method as set forth in claim 6, covering the second bituminous layer with a layer of gravel at a rate of substantially 7 lbs. per square yard.

9. A turf comprising superimposed layers of soil, substantially permanently granular mass and bitumen; germinated seeds in said soil; and grass growing from said seeds through said mass and said bitumen.

10. In a turf as set forth in claim 9, said granular mass being gravel consisting of a mixture of particles ranging in size from $\frac{1}{8}$ to $\frac{1}{18}$ inch.

11. In a turf as set forth in claim 9, said granular mass comprising granulated peat.

12. In a turf as set forth in claim 9, said granular mass being laid at the rate of 12–36 lbs. per square yard.

13. In a turf as set forth in claim 9, said bituminous layer having a penetration measured on the Dow penetrometer of from 300–500.

14. In a turf as set forth in claim 9, a layer of gravel upon the bituminous layer laid at the rate of 7 lbs. per square yard.

THOMAS FRANCIS NEATH ALEXANDER.

REFERENCES CITED

The following references are of record in the file of this patent:

UNITED STATES PATENTS

| Number | Name | Date |
|---|---|---|
| 1,274,527 | Eckart | Aug. 6, 1918 |
| 1,544,990 | Johnson | July 7, 1925 |
| 1,864,672 | Rose | June 28, 1932 |
| 2,333,959 | Smith | Nov. 9, 1943 |
| 2,351,273 | Littlefield | June 13, 1944 |

OTHER REFERENCES

Garden Dictionary, published 1938 by Houghton Mifflin Co., N. Y., pages 376, 433, 434, 587, 724, 743, 744, 745.

Perry, "Chemical Engineers' Handbook," second edition, published 1941, pages 454 and 455.

Patent file of Smith 2,333,959, Nov. 9, 1943, paper 5, filed June 1, 1943, fifteen pages.